United States Patent Office 2,961,052
Patented Nov. 22, 1960

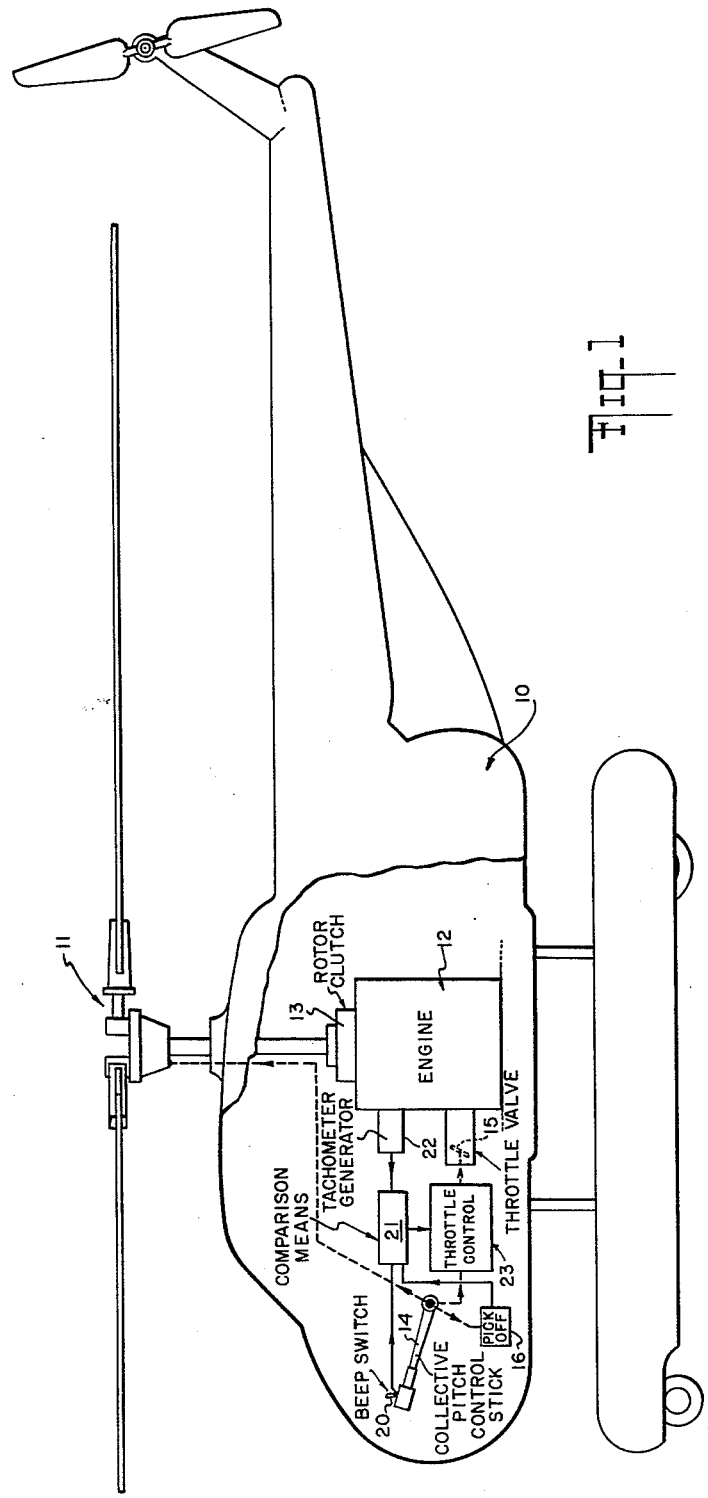

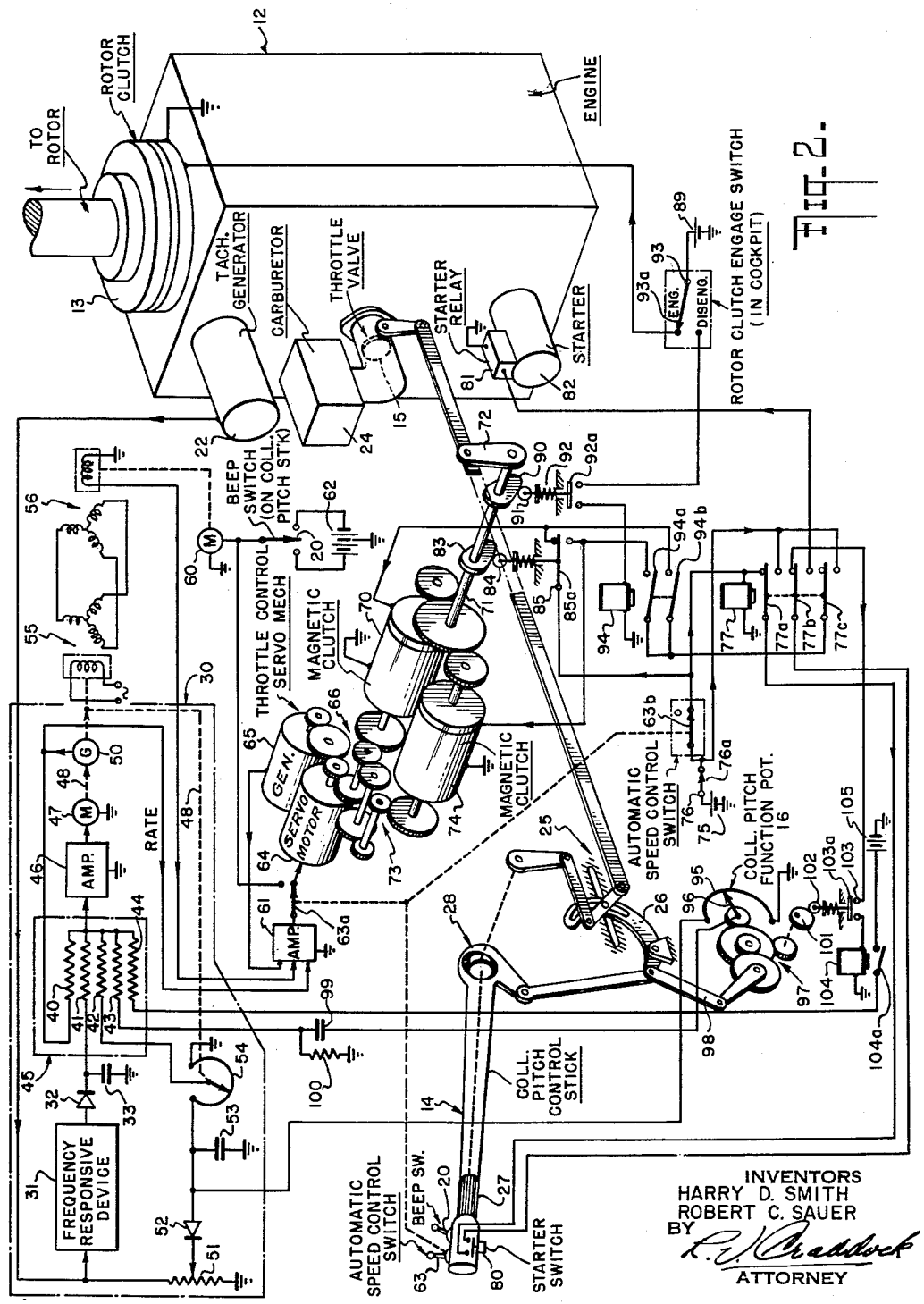

2,961,052

SPEED CONTROL SYSTEM FOR HELICOPTERS

Harry D. Smith, Massapequa Park, and Robert C. Sauer, Rosedale, N.Y., assignors to Sperry Rand Corporation, a corporation of Delaware Filed June 3, 1958, Ser. No. 739,537

17 Claims. (Cl. 170—135.74)

This invention relates to speed control systems and it is particularly adaptable for accurately controlling the engine speed of a helicopter to maintain a desired rotor speed in a plurality of modes of operation.

For accuracy and simplicity of control, it is desirable to maintain the rotor speed constant, since then the lift of the helicopter can be accurately varied by changes in the collective pitch of the rotor. Further, the rotor speed must be prevented from increasing appreciably beyond a particular design speed because:

(1) The blade and hub structure of the rotor may be damaged by excessive centrifugal loads, and (2) Excessive power is required at high rotor speed because rotor lift increases as the square of the speed while the power required increases as the cube of the speed. The use of excess power to drive the rotor at higher speeds reduces the load carrying ability and climb performance of the helicopter.

The rotor speed must be prevented from decreasing appreciably below a particular design speed because:

(1) Reduction in speed reduces the kinetic energy of the rotor and lowers the safety margin which insures the transition to an autorotation mode, (2) Low speeds can cause excessive coning of the rotor blades which consequent structural damage, and (3) The helicopter engine is often unable to provide the necessary power to maintain lift at low speed.

Maintaining a predetermined rotor speed during flight in a helicopter has heretofore occupied an excessive amount of the pilot's time, particularly during maneuvers or in turbulent air. This is due primarily to the wide variations in loading which the engine experiences by virtue of being connected to a variable pitch rotor that sustains the helicopter. The two principal disturbances that tend to change the rotor speed and consequently the engine speed are:

(1) Changes in the collective pitch of the rotor blades, and (2) Variations in rotor loading caused by maneuvers or gusts.

In an attempt to compensate for changes in the collective pitch of the rotor, the majority of present day helicopters are constructed with a mechanical linkage between the collective pitch control stick and the throttle valve in order that varying the collective pitch of the rotor automatically varies the throttle valve position to compensate for the variations in loading. This type of throttle control has contributed in relieving the pilot of making large throttle changes, but it will only hold rotor speed within certain limits. Further, it does not compensate for changes in wind conditions, such as gusts, nor does it compensate for variations in loading caused by maneuvers other than changes in collective pitch.

When transferring from one mode of operation to another, particularly during flight, the speed control system should respond smoothly without discontinuities in performance. Further, the system must maintain its stability over a wide range of engine loading. Inadvertent entry into the autorotation mode should also be prevented while a desired entry into this mode should be made rapidly and simply without requiring the pilot to remove his hands from the collective and cyclic pitch control members. A common problem during the engine warm-up period is overspeeding the engine which is caused inadvertently by the pilot. This is due to the engine being in an unloaded condition and to the increased sensitivity of the throttle valve near its closed position.

The primary object of the present invention is to provide a speed control system for accurately maintaining a desired engine speed although the engine is subjected to rapid variations in loading.

It is an additional object of the present invention to provide a speed control system that automatically compensates for controlled and uncontrolled load variations on the engine.

It is a further object of the present invention to provide a speed control system operable in a plurality of modes of operation to maintain a desired engine speed.

Another object of the present invention is to provide a speed control system which may be transferred from one mode of operation to another rapidly and smoothly.

It is an additional object of the present invention to provide a speed control system that accurately anticipates load variations to maintain a desired rotor speed.

Another object of the present invention is to provide safety features in a speed control system for a helicopter which do not impair the effective operation of the system.

The above objects are achieved by the present invention by providing a speed control system for a helicopter operable in manual, automatic and autorotation modes of operation wherein the transition from manual to an automatic mode of operation is smoothly and safely accomplished by a follow-up arrangement that eliminates transients in the system. In an automatic mode, the system is automatically driven through one of two different gear ratios to provide rapid response while insuring system stability over the desired speed range. In the automatic mode, electrical signals proportional to the expected changes in engine loading anticipate engine speed changes thereby maintaining a constant rotor speed. In this mode, means are also provided for comparing the actual engine speed signal with a desired engine speed as desired. The autorotation mode may be entered into rapidly while the pilot maintains his hands on the collective and cyclic control sticks by operating switch means conveniently mounted on the collective stick. Additional switching means are provided to prevent inadvertently entering the autorotation mode. In a manual mode, engine damage due to overspeed is prevented by novel means for locking the throttle valve.

The present invention will now be described with reference to the accompanying drawings wherein:

Fig. 1 is an elevational view of a helicopter including the present invention; and Fig. 2 schematically illustrates a preferred embodiment of the present invention as applied to a helicopter.

As shown in Fig. 1, a helicopter 10 has a variable pitch rotor 11 that sustains the helicopter in the air during flight. Engine 12 drives the rotor 11 through rotor clutch 13 at a speed equal to or proportional to the speed of engine 12. A collective pitch control stick 14 is mechanically connected to vary the collective pitch of the rotor 11 and to position the throttle valve 15 as a function of the vertical movement of stick 14 in a conventional manner. Pick-off means 16 is mechanically connected to be responsive to the vertical movement of stick 14 and is electrically connected to provide a signal as a function of said movement to comparison means 21.

Mounted on the collective pitch stick 14 is a beep switch 20 which, in a manner to be explained, is electrically connected to supply a signal in accordance with the desired engine speed to comparison means 21. A tachometer generator 22 is connected to be driven by engine 12 and provides a signal dependent upon the actual engine speed to comparison means 21. Comparison means 21 is connected to throttle control means 23 for providing a signal thereto proportional to the difference between a desired speed and the actual speed. Throttle control means 23 is connected to position the throttle valve 15 in a manner to eliminate said difference, in a manner to be more fully explained with reference to Fig. 2.

Referring now to Fig. 2, the vertical movement of the collective pitch control stick 14 varies the collective pitch of the rotor 11 which varies the load on engine 12 accordingly. To compensate for this variation in load in order to maintain a constant rotor speed, stick 14 is connected to simultaneously position the throttle valve 15 of carburetor 24 by means of a conventional linkage generally indicated at 25. Linkage 25 includes a compensating cam 26 for coordinating the throttle valve position with the pitch of the rotor 11 in accordance with the vertical movement of stick 14.

The collective pitch control stick 14 includes a twist grip 27 that is also connected to throttle control linkage 25 in a conventional manner, such as through bevel gears 28. Rotation of twist grip 27 positions throttle valve 15 in a conventional manner independently of the vertical movement of stick 14.

Tachometer generator 22 is connected to be driven by engine 12 for providing an output dependent upon the speed of engine 12. The output terminal of tachometer generator 22 is connected to the input terminal of a speed responsive mechanism 30. Speed responsive mechanism 30 may be of the type shown in copending application Serial No. 732,639, entitled Speed Responsive System and filed May 2, 1958 in the name of Harry D. Smith.

Within the speed responsive mechanism 30, the tachometer generator 22 is connected to frequency responsive device 31 which may be a differentiating type R-C circuit, the operation of which is more fully described in the aforementioned copending application. The output terminal of frequency responsive device 31 is connected to one side of rectifier 32. The other side of rectifier 32 is connected to one side of filter condenser 33 and to one end of resistor 41 of algebraic summation device 45. Each of the resistors 40, 41, 42, 43 and 44 of algebraic summation device 45 has one end connected to a common junction point. The junction of the resistors 40, 41, 42, 43 and 44 is connected to the input terminal of amplifier 46. The output terminal of amplifier 46 is connected to the input terminal of motor 47. The output shaft 48 of motor 47 is connected to drive generator 50. The output terminal of generator 50 is connected to the other end of resistor 40 to provide a stabilization signal in feedback fashion to amplifier 46.

The tachometer generator 22 is also connected to one end of voltage divider 51, which has its other end connected to a point of ground potential. The wiper of voltage divider 51 is connected to one side of rectifier 52. The other side of rectifier 52 is connected to one side of condenser 53 and to one end of potentiometer 54. The other end of condenser 53 and the other end of potentiometer 54 are connected to a point of ground potential. The slider arm of potentiometer 54 is connected to the other end of resistor 42. The output shaft 48 of motor 47 is connected to drive the slider arm of potentiometer 54, in a manner more fully explained in the aforementioned copending application.

The output shaft 48 of motor 47 is further connected to drive the rotor of synchro generator 55. The terminals of the rotor of synchro generator 55 are connected to a source of alternating potential. The stator windings of synchro generator 55 are connected to the corresponding windings of the stator of synchro control transformer 56. The rotor of control transformer 56 is connected to be positioned by the output shaft of motor 60. The rotor winding of control transformer 56 has one extremity connected to an input terminal of summing amplifier 61 while the other extremity is connected to a point of ground potential.

The input terminal of motor 60 is connected to the contact arm 20a of beep switch 20. The contact arm 20a may be selectively connected to the right or to the left contact as viewed in the drawing to connect motor 60 to the positive or negative terminal, respectively, of potential source 62. The output terminal of generator 50 is also connected to an input terminal of summing amplifier 61. The output terminal of amplifier 61 may be selectively connected, depending upon the position of the automatic speed control switch 63 by means of contact arm 63a thereof, to the input terminal of throttle control servomotor 64 or to the input terminal of motor 60. The output shaft of servomotor 64 is geared to drive generator 65. The output terminal of generator 65 is connected to an input terminal of summing amplifier 61 to provide a stabilization signal in feedback fashion thereto.

Servomotor 64 is connected by a low ratio gear train 66 to drive magnetic clutch 70. The gear ratio of gear train 66 may be 600:1, for example. The output shaft of magnetic clutch 70 is geared to one end of common output shaft 71. The other end of shaft 71 is connected by linkage 72 to throttle control linkage 25.

Servomotor 64 is also connected by a high ratio gear train 73 to the input shaft of magnetic clutch 74. The gear ratio of train 73 may be 4200:1, for example. The output shaft of magnetic clutch 74 is also connected by gearing to common output shaft 71.

Manually operable automatic speed control switch 63 has contact arms 63a and 63b connected for simultaneous movement. The operation of switch 63 selectively engages and disengages the automatic speed control system. A source of potential 75, such as a battery, is connected to contact arm 76a of main control switch 76. Switch 76 has its contact arm 76a connected to selectively disconnect the source of potential 75 or to simultaneously connect it to contact arm 63b of switch 63 and to the lower contacts of contact arms 77a and 77c of automatic speed control relay 77. Contact arm 63b of automatic speed control switch 63 may be selectively connected to an upper contact that is blank or to a lower contact. The lower contact of contact arm 63b is connected to automatic speed control relay 77, the upper contact of contact arm 77a, and to contact arm 85a of gain changing switch 85.

Automatic speed control relay 77 has three contact arms 77a, b and c mechanically ganged for simultaneous movement. Each of the contact arms 77a, b and c has upper and lower contacts as viewed in Fig. 2. The upper contact of contact arm 77c is blank. Contact arm 77a is connected to one contact of start-autorotate switch 80. The other contact of switch 80 is connected to contact arm 77b. The lower contact of contact arm 77b connects to the starter relay 81. Starter relay 81 is mounted on starter 82 which starts the engine 12 when relay 81 is energized.

Gain changing cam 83 is connected to common output shaft 71 for rotation therewith. Cam 83 has a spring-loaded cam follower 84 that cooperates with it. Cam follower 84 is connected to position contact arm 85a of gain changing switch 85 to engage an upper or a lower contact. In a similar manner, overspeed cam 90 is connected to be rotated by shaft 71 and has a cam spring-loaded follower 91 that cooperates with it to position contact arm 92a of overspeed switch 92. In its lower position, contact arm 92a engages right and left contacts of switch 92. In its upper position, the circuit between the right and left contacts of switch 92 is open.

Rotor clutch engage switch 93 has its contact arm 93a connected to a source of potential 89, such as 27 volts D.C. With contact arm 93a engaging its upper contact, switch 93 connects the source of potential 89 to rotor clutch 13. With contact arm 93a in its lower position, source 89 is connected to the right contact of overspeed switch 92. The left contact of switch 92 is connected to overspeed relay 94. Overspeed relay 94 has two ganged contact arms 94a and 94b. Contact arms 94a and 94b are electrically connected to contact arm 77c of relay 77. Contact arms 94a and 94b have upper and lower contacts, the lower contacts of each being blank. The upper contact of contact arm 94a connects to the lower contact of contact arm 85a of switch 85 and to magnetic clutch 74. The upper contact of contact arm 94b is connected to the upper contact of contact arm 85a and to magnetic clutch 70.

To provide a signal that is a function of the vertical movement of the collective pitch control stick 14, a pick-off means 16 including collective pitch function potentiometer 95 is connected to be responsive to the vertical movement of stick 14. This may be accomplished, for example, by connecting the slider arm 96 of potentiometer 95 by means of gearing 97 and linkage 98 to one extremity of the compensating cam 26. Potentiometer 95 is wound as a function of the collective pitch to provide a signal that is compensated for increased throttle sensitivity at light engine loads with nearly closed throttle. One extremity of potentiometer 95 is grounded while the other extremity may be connected between rectifier 52 and potentiometer 54. The slider arm 96 of potentiometer 95 is connected to one side of series condenser 99. The other side of condenser 99 is connected to one side of parallel resistor 100 and to the other end of resistor 43. The other side of resistor 100 is connected to ground. Series condenser 99 and parallel resistor 100 form a differentiating type R-C circuit.

Also connected to be positioned in accordance with the vertical movement of the collective pitch control stick 14 is an autorotation biasing cam 101 connected to be rotated by gearing 97. Cam 101 has a spring-loaded cam follower 102 cooperative with it that is connected to contact arm 103a of autorotation biasing switch 103. Switch 103 has right and left contacts. The right contact of switch 103 is connected to the upper contact of contact arm 77b of relay 77. The left contact of switch 103 is connected to autorotation biasing relay 104. Relay 104 has a contact arm 104a with a blank lower contact and an upper contact that connects to a source of potential 105. Contact arm 104a connects to the other end of resistor 44.

The operation of the above-described speed control system will now be explained with respect to its three modes of operation; manual, automatic and autorotation. When starting the engine 12 in the manual mode of operation, the main control switch 76 would normally have its contact arm 76a connected to the lower contact, the automatic speed control switch 63 would have its contact arms 63a and 63b in the off position; i.e., with contact arms 63a and 63b connected to their upper contacts, respectively, and rotor clutch engage switch 93 would have its contact arm 93a in the disengaged position; i.e., contacting the lower contact. With contact arm 63b of switch 63 in its upper position, automatic speed control relay 77 is unenergized and its contact arms 77a, b and c contact their lower contacts, respectively. To start the engine, the start-autorotate switch 80 is depressed thereby energizing starter relay 81 through the circuit consisting of the source of potential 75, switch 76, the lower contact of contact arm 77a, contact arm 77a, start-autorotate switch 80, contact arm 77b and the lower contact thereof to relay 81. By energizing relay 81, the starter 82 operates to start engine 12. With contact arm 93a of rotor clutch engage switch 93 in its lower position, rotor clutch 13 is unenergized, disengaging the rotor 11 from the engine 12 to allow the engine to come up to speed and warm up unloaded.

With the contact arm 63a of automatic speed control switch 63 contacting its upper contact, the output of amplifier 61 drives motor 60. The output signal from tachometer generator 22 and the output signal from potentiometer 95 are supplied to speed responsive mechanism 30. The output shaft rotation of speed responsive mechanism 30 rotates the rotor of synchro generator 55 and a corresponding signal is induced in the stator of control transformer 56. The resultant output signal from the rotor of control transformer 56 is connected to amplifier 61 for driving motor 60 in a direction to eliminate the signal. Any signals introduced by inadvertent movement of the beep switch 20 while in the manual mode of operation, will also be wiped out in a similar manner. Thus, in the manual mode, the speed control system continuously follows up on itself to eliminate any spurious signals including those caused by amplifier drift, etc., and the speed is maintained synchronized with the manually controlled operation of the engine in order that a smooth transition from manual to automatic may be accomplished without discontinuities in performance.

To prevent overspeeding the engine during warm-up while in the manual mode, as the pilot advances the throttle control linkage 25 to a position just prior to an overspeed condition, the overspeed cam 90 will be rotated to a position which will cause the contact arm 92a of overspeed switch 92 to close, and, with contact arm 93a of switch 93 in its lower position, overspeed relay 94 will be energized by potential source 89. Contact arms 94a and 94b of relay 94 will then be attracted to contact their upper contacts. In this manner, magnetic clutch 70 will be energized through a circuit consisting of contact arm 94b in its upper position, contact arm 77c in its lower position, contact arm 76a in its lower position and the source of potential 75. Similarly, magnetic clutch 74 will be energized through a circuit consisting of contact arm 94a in its upper position, contact arm 77c in its lower position, contact arm 76a in its lower position and source 75. By simultaneously energizing magnetic clutches 70 and 74, the common output shaft 71 geared thereto is locked thereby locking the throttle control linkage 25 and thus preventing additional movement of throttle valve 15 to avoid overspeeding the engine. To unlock the throttle valve 15, the pilot manually disconnects the main control switch 76 by moving its contact arm 76a to the upper position thereby disengaging magnetic clutches 70 and 74. After manually positioning the throttle valve 15 by means of stick 14 to provide a safe engine speed, the main control switch 76 is re-engaged.

When switching from manual to an automatic mode of operation, the pilot manually positions contact arms 63a and 63b of switch 63 from their upper position to their lower position. By connecting contact arm 63a to its lower contact, the output of amplifier 61 drives servomotor 64. By connecting contact arm 63b to its lower contact, automatic speed control relay 77 is energized thereby raising its contact arms 77a, 77b and 77c to their upper position.

At any convenient time after warm-up, the rotor clutch engage switch 93 may be manually positioned by the pilot to its upper position to energize the rotor clutch 13, thereby connecting engine 12 to drive rotor 11. Under normal conditions, magnetic clutch 70 is energized to connect servomotor 64 to output shaft 71 through low ratio gear train 66 by means of the circuit consisting of contact arm 85a which is normally in its upper position, contact arm 63b, contact arm 76a and potential source 75.

To maneuver the helicopter in the automatic mode of operation, the pilot moves the collective pitch control stick 14 in a vertical direction the same as he did in the manual mode of operation. As explained previously, if the rotor speed is maintained constant, the lift of the helicopter can be accurately varied by merely changing the collective pitch of the rotor 11. However, changing the collective pitch of the rotor 11 varies the load on the engine 12 which, in the absence of corrective action, would tend to vary the engine speed and consequently the rotor speed. To anticipate the change in loading and the change in speed of engine 12 due to a change in pitch in order to maintain a constant rotor speed, the vertical movement of stick 14 simultaneously varies the pitch on rotor 11 and positions the slider arm 96 of potentiometer 95.

By connecting one end of potentiometer 95 between rectifier 52 and potentiometer 54, the voltage across both potentiometers 95 and 54 is the same; i.e., proportional to actual engine speed and, because of rectifier 52, it is always negative. The signal from potentiometer 95 is thus the product of actual engine speed and a function of the vertical displacement of the collective pitch stick 14. This is desirable because the same effective speed error, and hence throttle valve movement, is provided for a given vertical displacement of stick 14 for all engine speeds. Further, in the embodiment shown, the output of speed responsive mechanism 30 is a quotient, as explained in detail in the aforementioned copending application, and inputs to summation device 45 are divided by a signal proportional to actual engine speed. Thus, to obtain an output from mechanism 30 proportional only to the vertical movement of stick 14, the corresponding input must be multiplied by a signal proportional to actual engine speed.

The electrical signal from potentiometer 95 is a load anticipation signal which varies the throttle valve position as a function of collective pitch position to compensate for changes in engine loading due to changes in pitch before they actually become effective in order to maintain a constant rotor speed; i.e., it is proportional to a desired engine speed.

To provide a phase advanced signal to compensate for the integrating effect of the throttle control servo system, the signal from slider arm 96 of potentiometer 95 is applied to the R-C circuit consisting of condenser 99 and resistor 100. This R-C circuit is a differentiating type circuit having a time constant adapted to compensate for the aforementioned integrating effect. The signal to summation device 45 from the R-C circuit is thus a function of the rate of change of the vertical displacement of stick 14.

When the collective pitch control stick 14 is moved in an upward direction, the slider arm 94 of potentiometer 95 is positioned to provide a signal having an increasingly negative magnitude. This signal, after passing through the aforementioned R-C network, is compared with the actual engine speed signal provided by tachometer generator 22 in summation device 45. The difference between these signals ultimately drives the throttle valve 15 through the throttle control servo, in a manner to be explained, to open the throttle valve 15 to maintain the engine speed constant with increased load. In a similar manner, when stick 14 is moved downward, the slider arm 94 of potentiometer 95 is moved to provide a less negative signal, resulting in closing the throttle valve 15 to maintain the engine speed constant with decreased load.

The output of summation device 45 is amplified in amplifier 46 to drive motor 47 to position the rotor of synchro generator 55 in accordance with the difference between the actual engine speed signal and the desired engine speed signal. The resultant signal in generator 55 is induced in control transformer 56 and provides an input signal to amplifier 61. The input signal to amplifier 61 has an amplitude and phase corresponding to the magnitude and sense of the deviation of the desired throttle valve position from the actual throttle valve position that is required to maintain a constant engine speed.

To provide a rate of change of the signal from amplifier 46, the output of generator 50 is also connected to the input of amplifier 61. The output of amplifier 61 drives servomotor 64 which in turn drives low ratio gear train 66, high ratio gear train 73 and generator 65. With clutch 70 individually energized and clutch 74 unenergized, servomotor 64 drives through the low ratio gear train 66 and clutch 70 to position shaft 71 in accordance with the output from amplifier 61. The rotation of shaft 71 positions throttle valve 15 by means of linkages 72 and 25 in a direction to increase or decrease the torque of engine 12 to maintain a constant engine speed.

In the automatic mode of operations, the system of the present invention will automatically maintain the engine speed and, consequently, the rotor speed constant although the load on the engine may vary due to uncontrolled conditions such as wind gusts. Assuming a gust varies the load on engine 12, the tachometer generator 22 immediately senses the change in engine speed and provides a signal accordingly. This is compared in summation device 45 with the reference signal established by the vertical position of stick 14. The difference between the two signals drives the throttle servo system to position the throttle valve 15 to maintain a constant engine speed.

The response of the present invention is considerably faster and more accurate than that of the human pilot and the speed control of the engine is maintained within a much more limited range than could ever be accomplished by the human pilot. By thus maintaining extremely accurate control over the engine speed, the helicopter can perform missions which heretofore could not have been successfully accomplished. By varying servo system gain, the speed control system can be adapted to helicopters having various aerodynamic and inertial characteristics.

When the pilot wishes to change the engine speed while in the automatic mode of operation, he introduces a signal proportional to the desired engine speed by positioning contact arm 20a of beep switch 20 to its right or left contact, and thereby introduces a signal to drive motor 60 in a direction to increase or decrease engine speed, respectively. The length of time that he holds contact arm 20a on the right or left contact determines the amount of increase or decrease of engine speed by driving motor 60 to the right or to the left for a corresponding period of time, which in turn rotates the rotor of control transformer 56 accordingly.

With stick 14 remaining in a fixed position, there is no output from potentiometer 95 and, consequently, the only input to speed responsive mechanism 30 is the actual engine speed signal from tachometer generator 22. The rotor of synchro generator 55 is rotated in accordance with said actual speed signal. The resultant of the actual speed signal is induced in the stator windings of control transformer 56. With the rotor of control transformer 56 being positioned in accordance with the desired engine signal, the output from the rotor is the difference between the desired engine speed and the actual engine speed, which is supplied to the input of amplifier 61. The operation of the throttle control servo system in accordance with the output from amplifier 61 is now similar to that previously described and the throttle valve 15 is positioned to increase or decrease engine speed accordingly until the desired engine speed is reached.

In the automatic mode of operation, when the throttle valve 15 approaches a nearly closed position with the engine lightly loaded, gain changing cam 83 rotates to position contact 85a of switch 85 in its downward position thereby disengaging clutch 70. In this condition of switch 85, clutch 74 is energized through contact arm 85a, contact arm 63b and contact arm 76a to a source of potential 75. Servomotor 64 then drives through the high ratio gear train 73 and clutch 74 to position shaft 71 and throttle valve 15. This change in gear ratio is advisable to maintain system stability when the throttle is in a nearly closed position due to increased throttle sensitivity and the light load on the engine. This may occur when the helicopter is performing tight maneuvers or when the air speed is being rapidly decreased.

While in the automatic mode of control, it may be desirable to suddenly go into the autorotation mode of operation. Within the rotor clutch 13 there is a freewheeling, overrunning element which disengages the engine 12 from the rotor 11 whenever the speed of the rotor shaft exceeds the speed of the clutch output shaft. The magnetic clutch portion of rotor clutch 13, once engaged prior to flight, remains engaged until after landing. To provide a means for rapidly disengaging the overrunning element of rotor clutch 13 while the pilot continues to have his hands on the collective pitch control stick 14 and the cyclic stick (not shown), the start-autorotation switch 80 may serve two functions:

(1) To start the engine as previously explained, and
(2) To enter into the autorotation mode of operation.

It is further desirable that the inadvertent operation of the start-autorotation switch 80 should not cause the overrunning element of rotor clutch 13 to disengage the rotor 11 from engine 12. To prevent the above when in an automatic mode of operation, the start-autorotate switch 80 is connected in series with switch 103 and relay 104. Thus, the collective pitch control stick 14 must be in a low position insuring low collective pitch on the rotor 11 before cam 101 operates to close contact arm 103a of switch 103. Then, if the pilot desires to go into the autorotation mode by depressing start-autorotate switch 80, a source 105 of positive biasing potential is connected to introduce a predetermined bias to effect rapid disengagement of the overrunning element of rotor clutch 13. With a low collective pitch and start-autorotate switch 80 closed, a circuit is made from a source of potential 75 to relay 104 through contact arm 76a, contact arm 63b, contact arm 77a, start-autorotate switch 80, contact arm 77b and contact arm 103a to energize relay 104. Energizing relay 104 brings contact arm 104a to its upper position and connects a source 105 of positive biasing potential to summation device 45. The biasing signal, operating through the throttle control servo mechanism, rapidly decreases the engine speed and disengages the overrunning element of rotor clutch 13. Reduction of engine speed by the inadvertent closing of start-autorotate switch 80 during flight is prevented by requiring the collective pitch control stick to be in a low position, indicative of an autorotation condition, before relay 104 is energizable.

While the invention has been described in its preferred embodiment, it is to be understood that the words which have been used are words of description rather than limitation and that changes within the purview of the appended claims may be made without departing from the scope and spirit of the invention in its broader aspects.

What is claimed is:

1. In combination, an engine speed control system having a plurality of modes of operation and adapted for a helicopter, a variable pitch sustaining rotor, an engine, a rotor clutch, said engine being disengageably connected through said rotor clutch to said rotor for selectively driving said rotor, a throttle valve connected to said engine, manually operable means drivably connected to said rotor and to said throttle valve for simultaneously varying the rotor pitch and the throttle valve position, said manually operable means including means for independently varying the throttle valve position, first signal generating means for providing a first signal proportional to the desired engine speed, second signal generating means driven by said engine for providing a second signal dependent upon the actual engine speed, means responsive to said first and second signals for providing a third signal proportional to the deviation of said actual engine speed from said desired engine speed, throttle control servo means adapted to be selectively responsive to said third signal including first and second power transmission means having first and second transmission ratios connected to first and second clutch means, respectively, said throttle control servo means being adapted to be selectively coupled to drive said throttle valve in accordance with said third signal through one of said transmission ratios when said first and second clutch means are individually engaged and being adapted to lock said throttle valve when said first and second clutch means are simultaneously engaged, and means including switching means for selectively engaging said system in one of a plurality of modes of operation and for selectively engaging said first and second clutch means individually and simultaneously whereby a safe and accurate engine speed control system having manual, automatic and autorotation modes of operation is provided.

2. In a helicopter having a variable pitch sustaining rotor, an engine, a rotor clutch, said engine being disengageably connected through said rotor clutch to said rotor for selectively driving said rotor, a throttle valve connected to said engine, a throttle control linkage having one end connected to said throttle valve, a manually operable member connected to said rotor and to the other end of said throttle control linkage for simultaneously varying the rotor pitch and the throttle valve position in accordance with the vertical movement of said member, said member including a manually operable twist grip portion connected to said throttle control linkage for independently varying the throttle valve position in accordance with the rotational movement of said twist grip, means for maintaining engine speed control in a plurality of modes of operation comprising means for providing a first output proportional to a desired engine speed, signal generating means driven by said engine for providing a second output dependent upon the actual engine speed, comparison means connected to be responsive to said first and second outputs for providing a signal proportional to the deviation of said second output from said first output, servo means responsive to said deviation signal for providing an output in accordance with said deviation signal, first and second gear trains connected to be driven by said servo means, said first gear train providing an appreciably lower gear ratio than said second gear train, a common output shaft, first and second clutches connected to be driven by said first and second gear trains, respectively, and selectively coupled to drive said common output shaft when individually engaged and coupled to lock said common output shaft when simultaneously engaged, and a linkage connecting said common output shaft to said throttle control linkage for actuating said throttle valve in a direction to eliminate said deviation whereby the engine speed may be accurately maintained in manual, automatic and autorotation modes of operation.

3. A combination as claimed in claim 2 including switching means including a plurality of switching devices each having at least two conditions for selectively providing a manual, automatic and autorotation mode of operation.

4. The combination as claimed in claim 2 including gain changing cam means connected to said common output shaft, means including switching means responsive to the movement of said gain changing cam means for selectively energizing one of said first and second clutches to provide a gear ratio depending upon the position of said throttle valve.

5. A combination as claimed in claim 2 including overspeed cam means connected to said common output shaft, and means including switching means responsive to the movement of said overspeed cam means for simultaneously energizing said first and second clutches to prevent movement of said throttle control linkage.

6. In combination, a helicopter having a variable pitch sustaining rotor, an engine, a rotor clutch, said engine being disengageably connected through said rotor clutch to said rotor for selectively driving said rotor, a throttle valve connected to said engine, a throttle control linkage having one end connected to said throttle valve, a manually operable member connected to said rotor and the other end of said throttle control linkage for simultaneously varying the rotor pitch and the throttle valve position in accordance with the vertical movement of said member, said member including a manually operable twist grip portion connected to said throttle control linkage for independently varying the throttle valve position in accordance with the rotational movement of said twist grip, a first signal generating means connected to be responsive to the vertical movement of said member for providing an output proportional to a desired engine speed, a switch connected to a power source, a motor connected to said switch having an output shaft driven an amount and in a direction dependent upon the duration and sense, respectively, of the operation of said switch for providing an output proportional to the desired engine speed, a second signal generating means driven by said engine for providing an output dependent upon the actual engine speed, comparison means connected to be responsive to the outputs from said first and second signal generating means and said motor for proving a signal proportional to the deviation of said actual engine speed from said desired engine speed, means including a throttle control servomotor responsive to said deviation signal, first and second gear trains connected to be driven by said servomotor, said first gear train providing a low gear ratio and said second gear train proving a high gear ratio relative to each other, a common output shaft, first and second clutches connected to be driven by said first and second gear trains, respectively, and selectively coupled to drive said common output shaft when individually engaged and coupled to lock said common output shaft when simultaneously engaged, a linkage connecting said common output shaft to said throttle control linkage for actuating said throttle valve in accordance with the deviation between said actual engine speed and said desired engine speed, and means including switching means for selectively providing manual, automatic and autorotation modes of operation.

7. In combination, a helicopter having a variable pitch sustaining rotor, an engine, a rotor clutch, said engine being disengageably connected through said rotor clutch to said rotor for selectively driving said rotor, a throttle valve connected to said engine, a throttle control linkage having one end connected to said throttle valve, a manually operable collective pitch control stick connected to said rotor and the other end of said throttle control linkage for simultaneously varying the rotor pitch and the throttle valve position in accordance with the vertical movement of said stick, said collective pitch stick including a manually operable throttle twist grip connected to said throttle control linkage for independently varying the throttle valve position in accordance with the rotational movement of said twist grip, a beep switch mounted on said stick and connected to a power source, a beep motor connected to said beep switch having an output shaft driven an amount and in a direction dependent upon the duration and sense, respectively, of the operation of said beep switch for providing an output proportional to the desired engine speed, a tachometer generator driven by said engine for providing an output dependent upon the actual engine speed, a speed responsive mechanism connected to receive said tachometer generator output for providing a shaft rotation proportional to said actual engine speed, a synchro generator having a rotor connected to be responsive to the shaft rotation of said speed responsive mechanism for providing a signal proportional to said actual engine speed, a synchro control transformer having its stator connected to be responsive to the synchro generator signal and its rotor connected to be driven by said beep motor for providing a signal proportional to the deviation of said actual engine speed from said desired engine speed, a throttle control servomotor, an amplifier responsive to said deviation signal and connected to control said servomotor, first and second gear trains connected to be driven by said servomotor, said first gear train providing a low gear ratio and said second gear train providing a high gear ratio relative to each other, a common output shaft, first and second clutches connected to be driven by said first and second gear trains, respectively, and selectively coupled to drive said common output shaft when individually engaged and coupled to lock said common output shaft when simultaneously engaged, and a linkage connecting said common output shaft to said throttle control linkage for actuating said throttle valve in accordance with the deviation between said actual engine speed and said desired engine speed whereby the desired engine speed may be accurately maintained in manual, automatic and autorotation modes of operation.

8. A combination as claimed in claim 7 including means including pick-off means responsive to the vertical movement of the collective pitch control stick for providing a signal as a function of said vertical movement to said speed responsive mechanism.

9. A combination as claimed in claim 8 wherein said last-mentioned means includes a differentiating type R–C circuit responsive to said signal for advancing its phase.

10. A combination as claimed in claim 7 including means responsive to the vertical movement of the collective pitch control stick for providing the same effective speed error signal for a given vertical displacement of said stick at all engine speeds.

11. A combination as claimed in claim 7 including a manually operable switch connected to selectively apply the output of said amplifier of the input of said beep motor and to the input of said servomotor whereby a smooth transition from the manual mode of operation to the automatic mode of operation may be accomplished without discontinuities in performance.

12. A combination as claimed in claim 7 wherein said speed responsive mechanism includes a generator responsive to said shaft rotation for providing a signal proportional to the rate of change of actual engine speed, and means for applying said signal to said amplifier.

13. In combination, an engine speed control system adapted for a helicopter, an engine, a variable pitch rotor driven by said engine for sustaining said helicopter whereby variations in the pitch of said rotor cause variations in engine loading which tend to result in variations in engine speed, a throttle valve connected to said engine, manually operable means connected to said rotor and to said throttle valve for simultaneously varying the collective pitch of the rotor and the throttle valve position, and additional means including signal generating means responsive to the movement of said manually operable means and connected to vary the throttle valve position as a function of said collective pitch to anticipate changes in engine loading due to changes in collective pitch in order to maintain the rotor speed constant.

14. A combination as claimed in claim 13 wherein said additional means includes pick-off means responsive to the movement of the manually operable means for providing a signal as a function of said movement to said throttle valve.

15. A combination as claimed in claim 14 wherein said additional means includes a differentiating type R–C circuit responsive to said signal for advancing its phase.

16. A combination as claimed in claim 13 wherein said additional means includes means responsive to the movement of the manually operable means for providing the same effective speed error signal for a given displacement of said manually operable means at all engine speeds.

17. A combination as claimed in claim 13 including means including switching means responsive to a predetermined range of positions of said manually operable means for allowing an autorotation mode of operation to be established only when said manually operable means is within said range whereby inadvertent entry into said autorotation mode is prevented when the position of the manually operable means is outside of said range.

References Cited in the file of this patent

UNITED STATES PATENTS

| | | |
|---|---|---|
| 2,517,150 | Webb | Aug. 1, 1950 |
| 2,613,751 | Donovan et al. | Oct. 14, 1952 |
| 2,640,551 | Plumb | June 2, 1953 |
| 2,679,296 | Morain | May 25, 1954 |